US010565513B2

(12) United States Patent
Cantwell

(10) Patent No.: US 10,565,513 B2
(45) Date of Patent: Feb. 18, 2020

(54) TIME-SERIES FAULT DETECTION, FAULT CLASSIFICATION, AND TRANSITION ANALYSIS USING A K-NEAREST-NEIGHBOR AND LOGISTIC REGRESSION APPROACH

(71) Applicant: Applied Materials, Inc., Santa Clara, CA (US)

(72) Inventor: Dermot Cantwell, Sunnyvale, CA (US)

(73) Assignee: Applied Materials, Inc., Santa Clara, CA (US)

( * ) Notice: Subject to any disclaimer, the term of this patent is extended or adjusted under 35 U.S.C. 154(b) by 670 days.

(21) Appl. No.: 15/269,530

(22) Filed: Sep. 19, 2016

(65) Prior Publication Data

US 2018/0082201 A1    Mar. 22, 2018

(51) Int. Cl.
*G06N 7/00* (2006.01)
*G06N 20/00* (2019.01)
*G06F 11/07* (2006.01)

(52) U.S. Cl.
CPC .......... *G06N 7/005* (2013.01); *G06F 11/079* (2013.01); *G06F 11/0727* (2013.01); *G06F 11/0751* (2013.01); *G06F 11/0787* (2013.01); *G06N 20/00* (2019.01)

(58) Field of Classification Search
CPC .... G06N 7/005; G06N 20/00; G06F 11/0727; G06F 11/0751; G06F 11/0787; G06F 11/079
See application file for complete search history.

(56) References Cited

U.S. PATENT DOCUMENTS

| 8,731,724 | B2 * | 5/2014 | Drees | G05B 15/02 |
| | | | | 700/276 |
| 9,262,726 | B2 | 2/2016 | Cantwell | |
| 2007/0239753 | A1 | 10/2007 | Leonard | |

(Continued)

FOREIGN PATENT DOCUMENTS

WO    2016/122591 A1    8/2016

OTHER PUBLICATIONS

A. Bagnall, J. Lines, J. Hills and A. Bostrom, "Time-Series Classification with COTE: The Collective of Transformation-Based Ensembles," in IEEE Transactions on Knowledge and Data Engineering, vol. 27, No. 9, pp. 2522-2535, Sep. 1, 2015. (Year: 2015).*

(Continued)

*Primary Examiner* — Kamran Afshar
*Assistant Examiner* — Imad Kassim
(74) *Attorney, Agent, or Firm* — Lowenstein Sandler LLP

(57) ABSTRACT

Methods and systems for time-series transient analysis of data are disclosed herein. A method includes receiving time-series data, generating a training data set including randomized data points, generating randomized data point combinations using a set of the randomized data points that are within a time window, computing distance values based on the randomized data point combinations, generating a classifier based on a plurality of computed distance values, and determining, using the classifier, a probability that new time-series data generated during a new execution of the process matches the time-series data. A system for performing the method is also disclosed.

17 Claims, 13 Drawing Sheets

(56) References Cited

U.S. PATENT DOCUMENTS

2015/0269050 A1 9/2015 Filimonov et al.
2015/0347568 A1 12/2015 Chen et al.

OTHER PUBLICATIONS

Dakos V, Carpenter SR, Brock WA, Ellison AM, Guttal V, Ives AR, et al. (2012) Methods for Detecting Early Warnings of Critical Transitions in Time Series Illustrated Using Simulated Ecological Data. PLoS ONE 7(7): e41010. (Year: 2012).*
Jakkula, Vikramaditya R. and Diane J. Cook. "Mining Sensor Data in Smart Environment for Temporal Activity Prediction." (2007). (Year: 2007).*
Zhengzheng Xing, Jian Pei, Philip S. Yu, and Ke Wang "Extracting Interpretable Features for Early Classification on Time Series", Proceedings of the 2011 SIAM International Conference on Data Mining. 2011, 247-258 (Year: 2011).*
International Search Report and Written Opinion dated Jan. 30, 2018, on application No. PCT/US2017/052334.
Daniel Kifer et al., Detecting Change in data streams, In: Proceedings of the 30th international conference on Very large data bases (VLDB)—vol. 30 pp. 180-191, Sep. 3, 2004 See pp. 183-188.

* cited by examiner

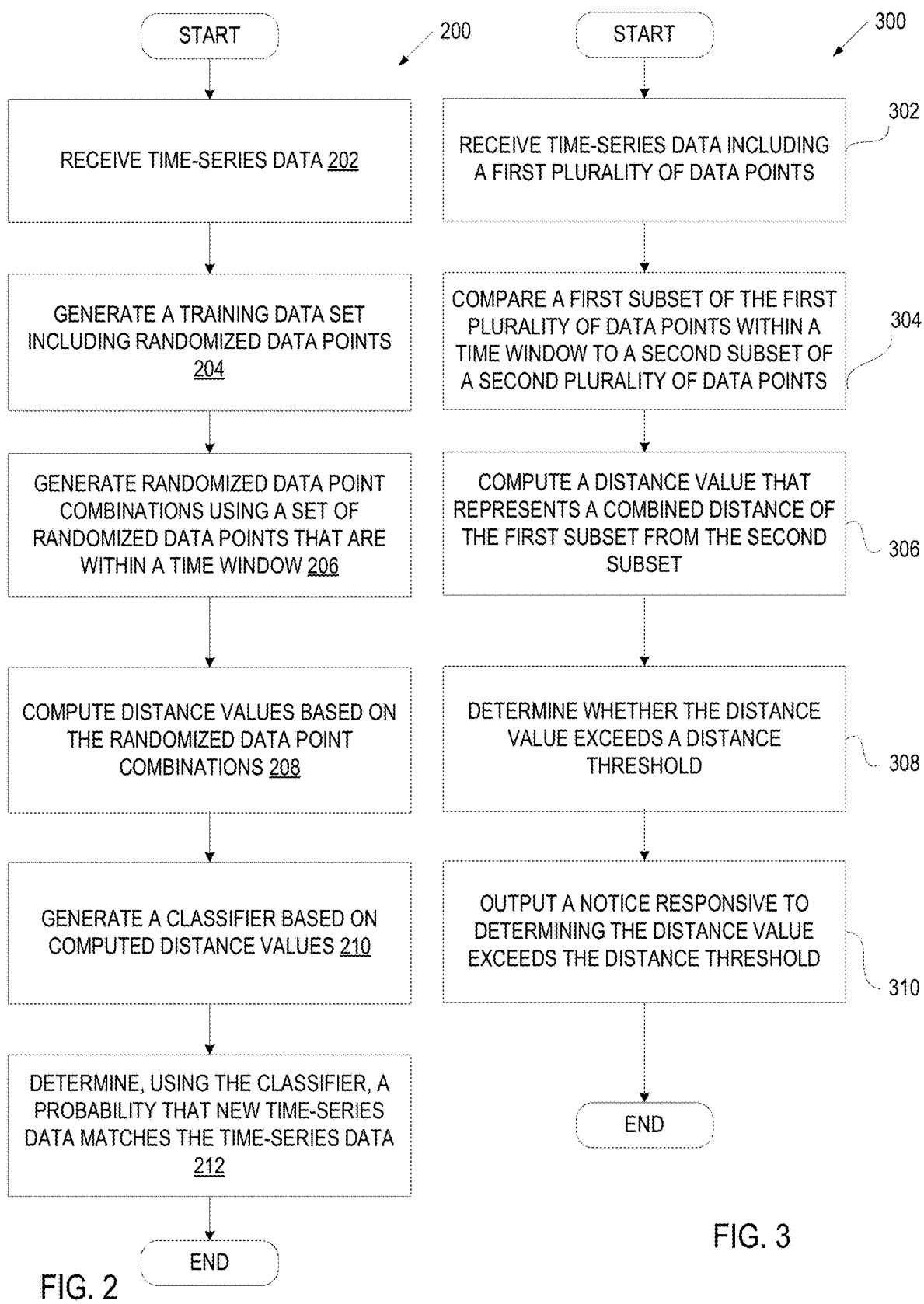

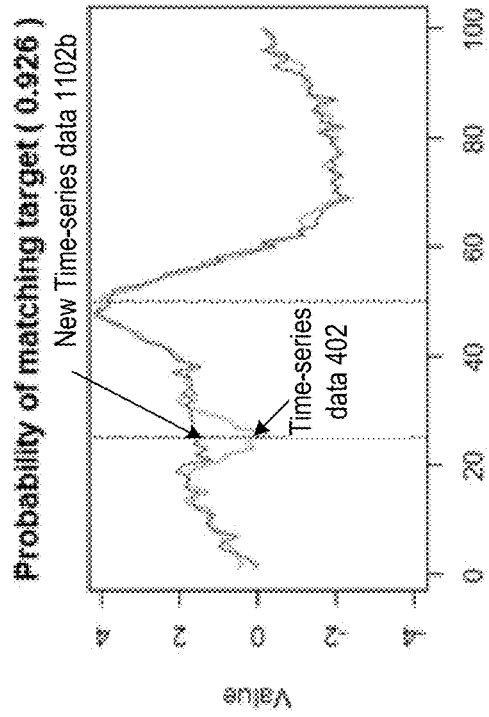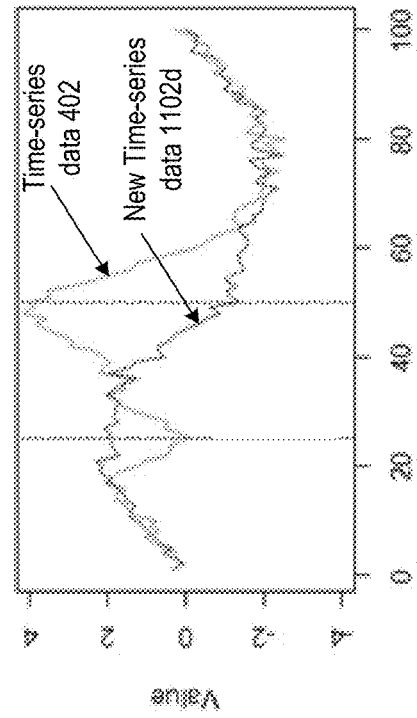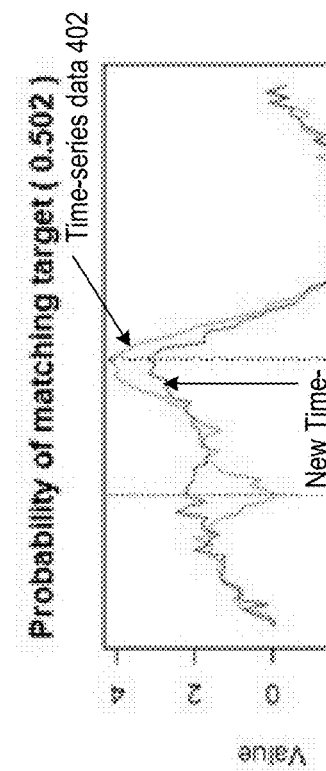
FIG. 11A  FIG. 11B  FIG. 11C  FIG. 11D

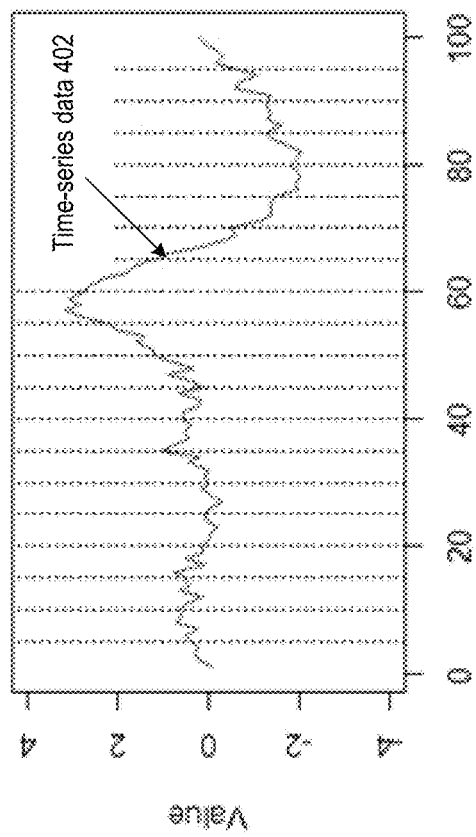
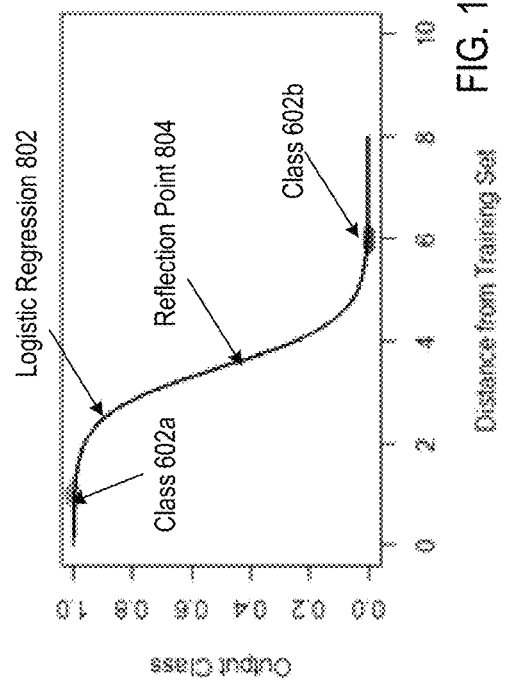
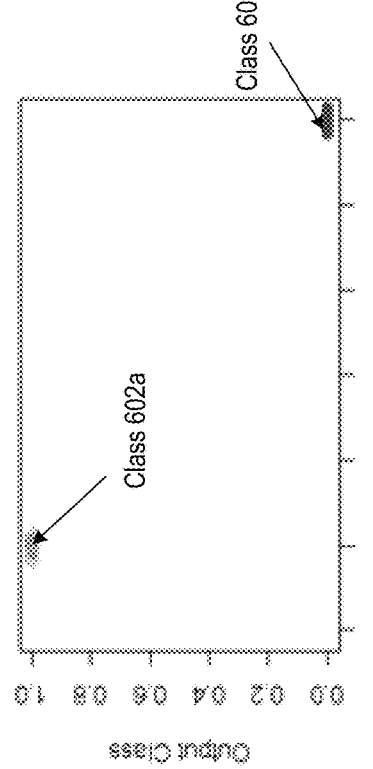

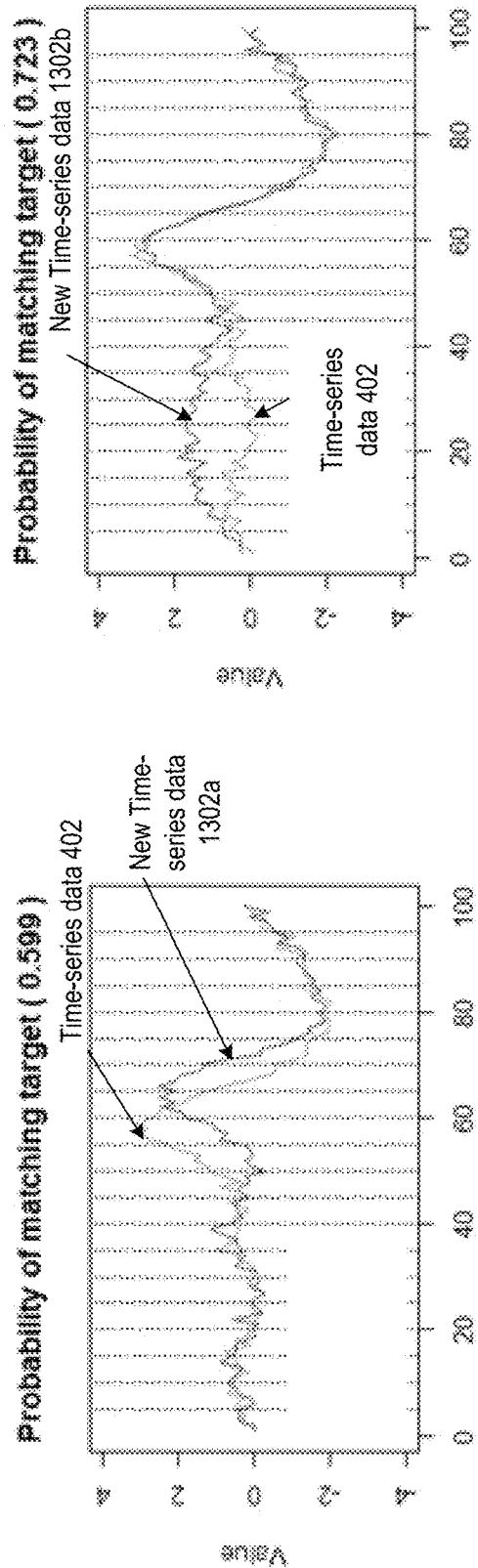
FIG. 13A
FIG. 13B
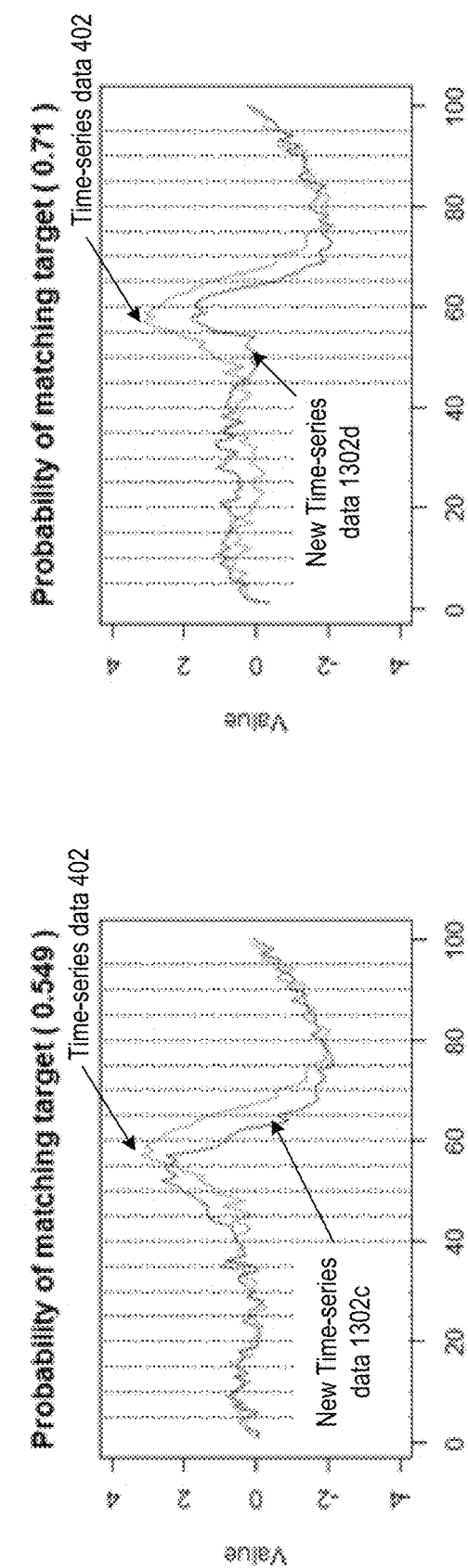
FIG. 13C
FIG. 13D

TIME-SERIES FAULT DETECTION, FAULT CLASSIFICATION, AND TRANSITION ANALYSIS USING A K-NEAREST-NEIGHBOR AND LOGISTIC REGRESSION APPROACH

TECHNICAL FIELD

The present disclosure relates to artificial neural networks, and, more particularly, to time-series fault detection, fault classification, and transition analysis for analyzing a system.

BACKGROUND OF THE INVENTION

Processes such as semiconductor processing processes include multiple steps over an interval of time. A process may include a transition from a first step to a second step. Time-series data is data collected over the interval of time, including the transition (e.g., the time-series transition). Typically, statistical methods (e.g., statistical process control (SPC)) are utilized to analyze sensor data for semiconductor manufacturing processes. However, SPC and other statistical methods of monitoring processes are not capable of monitoring time-series transitions. Statistical methods cannot detect short-time signal perturbations in data received from sensors over time. Statistical methods also provide false positives (e.g., that an entire signal does not match a target signal because a minimal portion of the signal is outside of a guard band) and do not allow for adjustment of the sensitivity of anomaly detection.

BRIEF DESCRIPTION OF THE DRAWINGS

The present disclosure is illustrated by way of example, and not by way of limitation, in the figures of the accompanying drawings.

FIG. 2 illustrates one embodiment of a method for time-series transition analysis.

FIG. 3 illustrates another embodiment of a method for time-series transition analysis.

FIGS. 11A-11D illustrate probability of matching the time-series data for time-series transition analysis.

FIG. 12A illustrates time-series data for time-series transition analysis.

FIG. 12B illustrates distance from training set for time-series transition analysis.

FIG. 12C illustrates logistic regression for time-series transition analysis.

FIGS. 13A-13D illustrate probability of matching the time-series data for time-series transition analysis.

DETAILED DESCRIPTION

Figure 1:
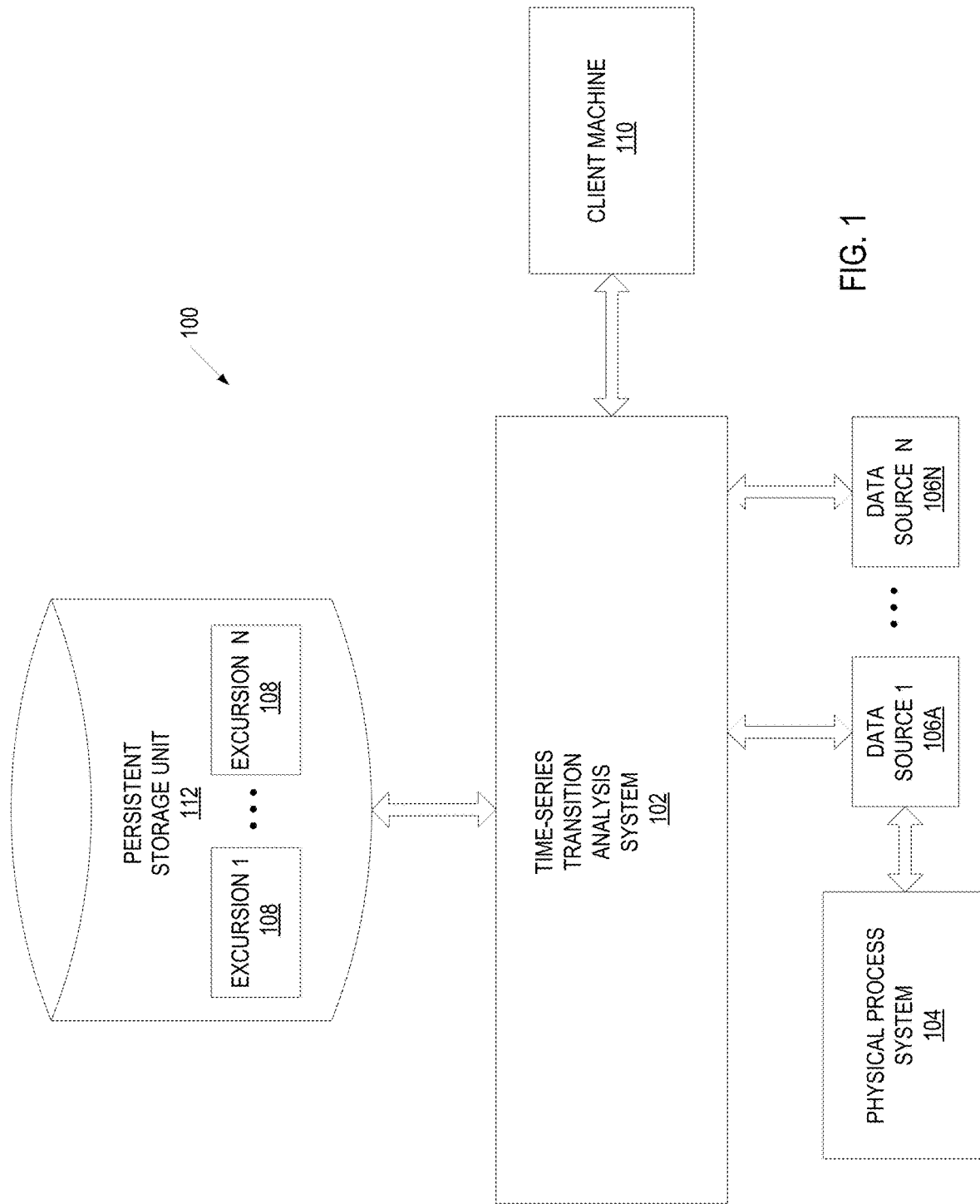
FIG. 1 illustrates one embodiment of a network architecture.

Embodiments of the present disclosure are directed to a method and system for time-series transition analysis of data. For example, data samples may be sensor data from semi-conductor processing equipment. In one embodiment, the method and system can detect the probability of new time-series data matching previous time-series data. The time-series transition analysis may be performed by using a combination of k-Nearest Neighbor (kNN) analysis and logistic regression (LR) in embodiments. Embodiments of the present disclosure are extensible in that sensitivity of the time-series transition analysis can be adjusted.

As processes (e.g., manufacturing processes) include shorter step times, smaller parts, tighter tolerances, and so forth, transitions (e.g., how to get from step A to step B in a manufacturing process) become more critical. Problems may occur if a process overshoots or undershoots a transition (e.g., transition from 10 degrees to 20 degrees too fast, transition from 10 degrees to 20 degrees too slow, etc.). Repeatable performance includes consistent transitions. Conventional monitoring methods (e.g., SPC) are not capable of monitoring transient time-series and cannot detect short-time signal perturbations in data received from sensors over time (referred to herein as sensor time-series data). These short anomalies can cause defects (e.g., on-wafer defects) or reduce yield.

Time-series transition analysis provides the ability to monitor time-series transitions. Time-series transition analysis may detect rare, strange, and/or unexpected sequences (e.g., shape, magnitude, position, etc. of a curve of the time-series data (value plotted against sample); see FIG. 4) that are undetectable via conventional methods. In one embodiment, the monitoring of time-series transitions is performed by estimating an expected transition trajectory from historical time-series data and comparing the trajectory of new time-series data to the trajectory of the historical time-series data. Time-series transition analysis may also detect short anomalies and provide tuning parameters to sensitize or desensitize the accuracy of the detection. Time-series transition analysis may also overcome false positive rates of conventional approaches. For example, guard band analysis may provide a false positive that an entire signal does not match a target signal because a minimal portion of the signal is outside of a guard band, whereas the time-series transition analysis provides a probability of the signal matching the target signal and does not provide the false positive. In another embodiment, time-series transition analysis may be used to detect short-time signal perturbations (e.g., capture perturbations signature (e.g., similarity search) to search for all instances of an FDC).

Fault detection classification (FDC) of time-series data may monitor data from a single sensor which may make the classification inaccurate. More information can be extracted by monitoring multiple signals that co-vary in time (e.g., valve position changing before a pressure spike may indicate an issue on a pressure control logic, a pressure spike before the valve position change may indicate an issue with a pressure sensor, etc.). The techniques disclosed herein address coupling signals that co-vary with time.

Time-series transition analysis may combine a k-Nearest Neighbor (kNN) approach (e.g., a kNN algorithm) with a logistic regression (LR) binary classifier to achieve the time-series monitoring. Specific excursions in time-series data may be detected using a combination of kNN and LR. Time-series transition analysis may use kNN to reduce a short term time-series transition per time window (e.g., a 1 second sliding time window over a 100 second interval of time) to a single dimension to determine a distance from expected behavior. Time-series transition analysis may use LR to build a binary classifier which is used to create a probability that new time-series data have the target pattern or not (e.g., whether new time-series data is outside of a distance determined by the kNN approach).

Time-series transition analysis may be used to detect transitions between set point changes in a process in view of time-series data and detect a deviation from an expected transition trajectory in the new time-series data. The expected transition trajectory may be defined by the time-series data.

FIG. 1 illustrates a network architecture 100 according to one embodiment. Initially, a time-series transition analysis system 102 identifies data sources 106A-N (e.g., sensors) that define a system and/or that are used to monitor a system, such as a physical process system 104. Physical process system 104 may be a semiconductor processing equipment, such as a chamber for an etch reactor, a deposition chamber, and so on. A user may select (e.g., via a graphical user interface (GUI)) time-series data (e.g., samples) from various ones of the data sources 106A-N via a client machine 110. The time-series transition analysis system 102 generates a training data set and computes distance values based on the training data set and the time-series data.

In an embodiment, a user may also select excursions 108 (i.e., defined parameters of abnormal system behavior) via the client machine 110, and the excursions 108 may be stored in a persistent storage unit 112 by the time-series transition analysis system 102.

For example, the physical process system 104 could include manufacturing tools or be connected to manufacturing tools directly or via a network (e.g., a local area network (LAN)). Examples of manufacturing tools include semiconductor manufacturing tools, such as etchers, chemical vapor deposition furnaces, etc., for the manufacture of electronic devices. Manufacturing such devices may include dozens of manufacturing steps involving different types of manufacturing processes, which may be known as a recipe.

The physical process system 104 can include any type of computing device, including desktop computers, laptop computers, programmable logic controllers (PLCs), handheld computers or similar computing devices, to control the system. Data sources 106, such as sensors, may be part of the physical process system 104 and/or the manufacturing tools or may be connected to the physical process system 104 and/or the manufacturing tools (e.g., via a network).

Client machines 110 can be any type of computing device including desktop computers, laptop computers, mobile communications devices, cell phone, smart phones, handheld computers or similar computing devices.

In one embodiment, the physical process system 104, the data sources 106, the persistent storage unit 112, and the client machine 110 are connected to the time-series transition analysis system 102, which may be a direct connection or an indirect connection via a hardware interface (not shown), or via a network (not shown). The network can be a local area network (LAN), such as an intranet within a company, a wireless network, a mobile communications network, or a wide area network (WAN), such as the Internet or similar communication system. The network can include any number of networking and computing devices such as wired and wireless devices.

The division of functionality presented above is by way of example only. In other embodiments, the functionality described could be combined into a monolithic component or sub-divided into any combination of components. For example, the client machine 110 and the time-series transition analysis system 102 can be hosted on a single computer system, on separate computer systems, or on a combination thereof.

FIG. 2 illustrates one embodiment of a method 200 for time-series transition analysis. Method 200 can be performed by processing logic that can comprise hardware (e.g., circuitry, dedicated logic, programmable logic, microcode, etc.), software (e.g., instructions run on a processing device), or a combination thereof. In one embodiment, method 200 is performed by the time-series transition analysis system 102 of FIG. 1.

Figure 4:
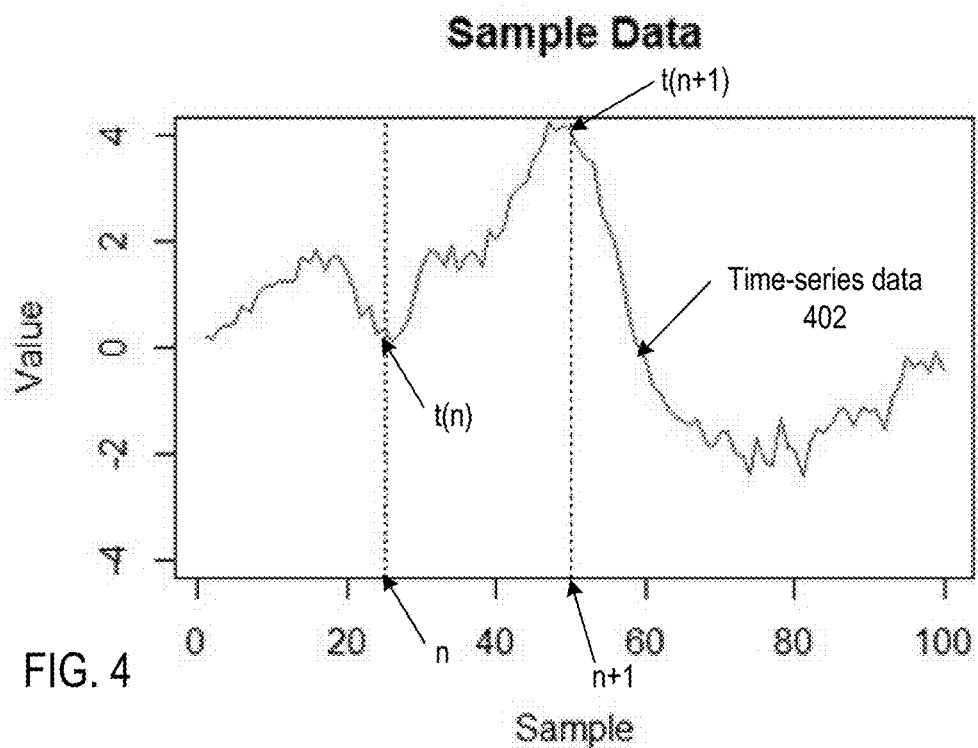
FIG. 4 illustrates time-series data for time-series transition analysis.

At block 202 of FIG. 2, processing logic of the time-series transition analysis system 102 receives time-series data 402 (e.g., a target signal), as shown in FIG. 4. One or more sensors may generate the time-series data 402 during a process (e.g., a manufacturing process). The time-series data 402 may include a first plurality of data points. The first plurality of data points may include data points at samples of the time-series data 402. For example, as shown in FIG. 4, samples may be taken at n=25 and n+1=50. The values of the time-series data 402 may include t(n) and t(n+1) at about [0,4].

Figure 5A:
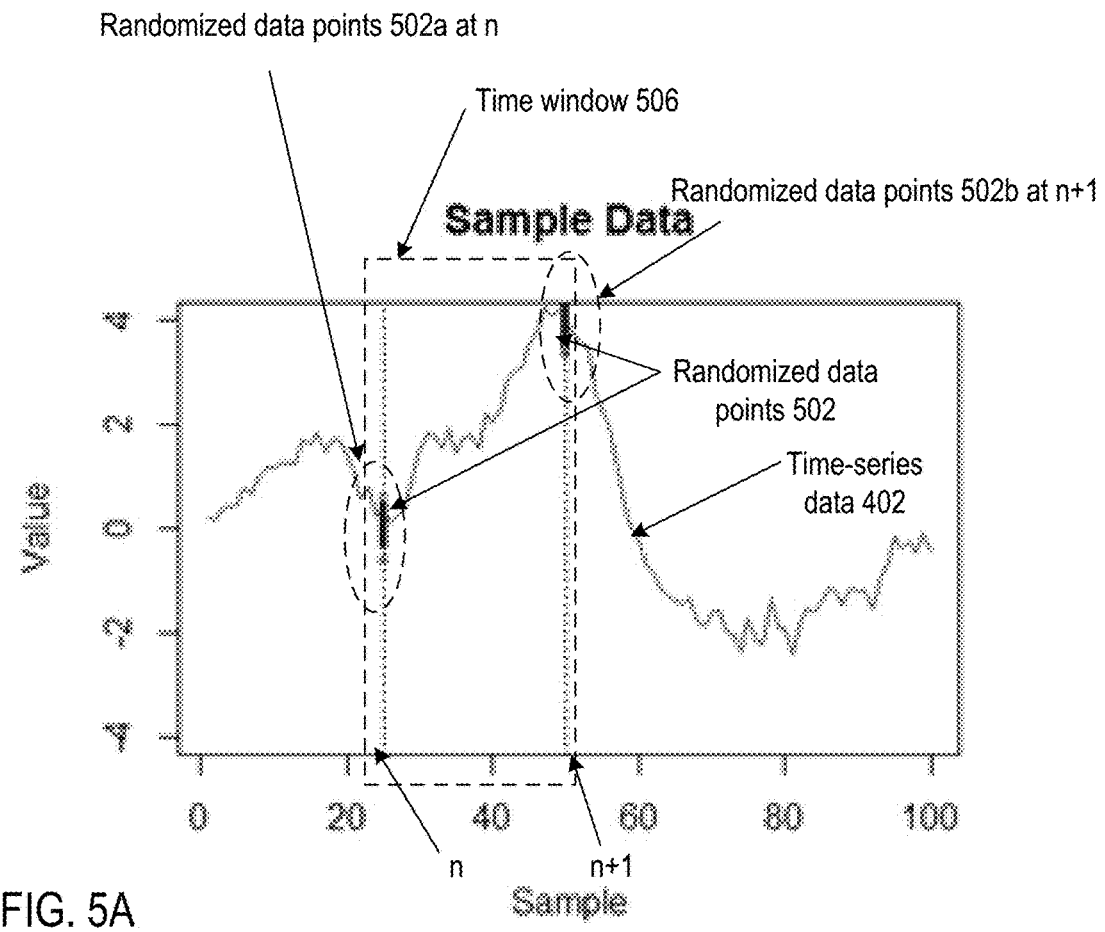
FIG. 5A illustrates randomized data point combinations and time window for time-series transition analysis.

Returning to FIG. 2, at block 204, processing logic of the time-series transition analysis system 102 generates a training data set including randomized data points 502 (e.g., random samples), as shown in FIG. 5A. The randomized data points 502 may include a distribution of an expected range for one or more excursions from the time-series data 402. The distribution may be a normal distribution or another distribution. In one embodiment, 100 random samples are generated, where each random sample represents an excursion from the time-series data. As shown in the example in FIG. 5A, the randomized data points 502 include excursions at each of the data points (e.g., n and n+1). For example, data points are clustered around [0,4] at n=25 and n=50. The randomized data points 502 may be used as a training set for the pattern of time-series data 402. Each randomized data point of the randomized data points 502 may correspond to one of the first plurality of data points from the time-series data 402.

Returning to FIG. 2, at block 206, processing logic of the time-series transition analysis system 102 generates randomized data point combinations using a set of randomized data points 502 that are within a time window 506, as shown in FIG. 5A. For example, a randomized data point combination may include one of the randomized data points 502a within the instance of time window 506 from 0 to n (e.g., 25) and one of the randomized data points 502b within the instance of time window 506 from n to n+1 (e.g., 25 to 50). In one embodiment, the processing logic may generate randomized data points at the end of time window 506 (e.g., see FIG. 5A). In another embodiment, processing logic may generate randomized data points at a midpoint of the time window 506. In another embodiment, the processing logic may generate randomized data points at the beginning of the time window 506.

The time window 506 may be a sliding time window and the process may take place over an interval of time that is larger than the sliding time window. A sliding time window may be a time period that stretches back in time from the present. For instance, a sliding window of two seconds may include any samples or data points that have occurred in the past two seconds. In one embodiment of a sliding time window, the first instance could be 0-25, the second instance could be 25-50, and so on. Thus, the window slides by 25 seconds. In another embodiment of a sliding time window, the first instance could also be 0-25, the second instance could be 1-26, then 2-27, and so on. Thus, the time window slides by 1 second (or other unit of time).

The generating of the randomized data point combinations may be performed for each of a plurality of instances of the sliding time window 506. Each instance of the plurality of instances may span a different time period in the interval of time (e.g., randomized data point combination includes a sample from a first data point at n and a second data point at n+1.).

Returning to FIG. 2, at block 208, processing logic of the time-series transition analysis system 102 computes distance values based on the randomized data point combinations. A first distance value may be computed for the first randomized data point combination. The first distance value may represent a combined distance of the first subset of the set of the plurality of randomized data points from the first subset of the first plurality of data points. The computing of the distance values may be performed for each of a plurality of instances of the sliding time window.

Figure 5B:
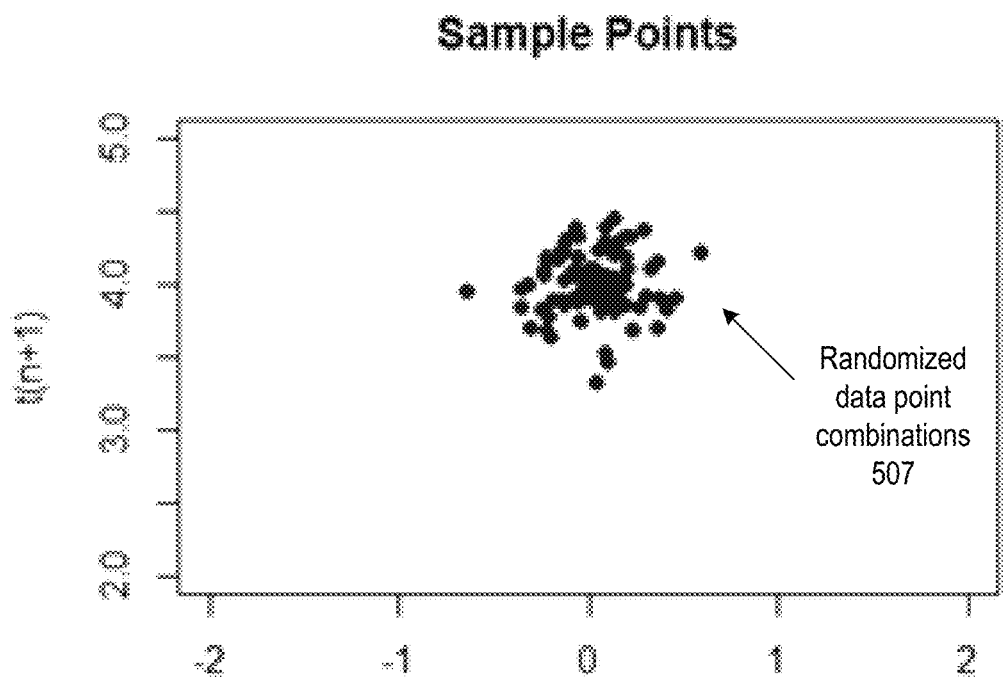
FIG. 5B illustrates distances between randomized data points for time-series transition analysis.

As shown in FIG. 5B, the randomized data points may be combined to provide randomized data point combinations 507 that each include a first randomized data point from t(n) and a second randomized data point from t(n+1). These randomized data point combinations 507 may be used to compute distance values using a k-Nearest Neighbor algorithm.

The processing logic may compute, using a k-Nearest Neighbor (kNN) algorithm, a distance threshold for each instance of the time window 506. For example, a first distance threshold may be generated for the time window 506 at time t=25 (e.g., using data points at times 0-25), a second distance threshold may be generated for the time window 506 at time t=26 (e.g., using data points at times 1-26), and so on. The computing of the distance threshold may include computing, for each of the plurality of randomized data point combinations 507, a Euclidean distance between a randomized data point combination 507 and each remaining randomized data point combination 507 from the training data set (see FIG. 5B). The computing of the distance threshold may include identifying a smallest Euclidean distance from computed Euclidean distances. The smallest Euclidean distance may be the distance threshold.

Using a kNN type algorithm, the training data set can be used to estimate the distance between an excursion sample and the training data. For each training sample that includes a randomized data point combination, the Euclidean distance between this sample and all others in the training set can be computed and the kth smallest value may be stored. For a sample j, the distance is calculated by the equation of $d_j = \text{small}_k(x_j - X)$, where X is a n×m matrix. The value n represents the number of training samples (e.g., 100 random samples). The value of m may represent the number of time samples or data points (e.g., two time samples of n=25 and n+1=50 in the illustrated example of FIGS. 4-6). The variable $x_j$ may be an m-element vector (e.g., [0,4]) and may represent the jth row in X. This process is repeated for all samples in the training set yielding the neighbor or limit vector L with n elements. The neighbor or limit vector L may be used to create a well-separated training set to train a simple classifier. Random samples from the training set may be selected to compute $k_{nn} = \text{small}_k(x_j - X)$ for each sample. Random samples not from the training set may be selected and the $k_{nn}$ value computed for visualization purposes.

Figure 6:
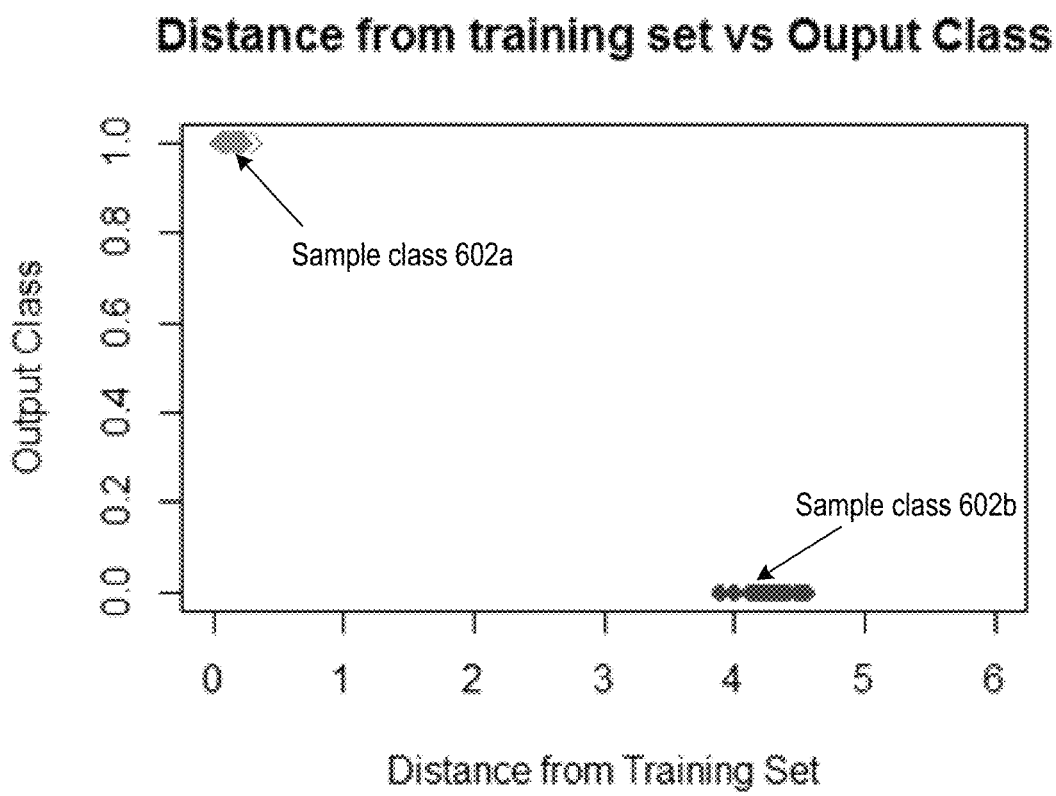
FIG. 6 illustrates distance from training set for time-series transition analysis.

As shown in FIG. 6, random samples were selected from the excursion pattern (sample class 602a) and the $k_{nn}$ metric was estimated. Random samples were selected exhibiting non-excursion behavior (sample class 602b) and the $k_{nn}$ metric was estimated. Sample class 602a shows a smaller distance to the training set than sample class 602b. In FIG. 6, a two-dimensional signal has been reduced to a one-dimensional metric that appears linearly separable.

Figure 7A:
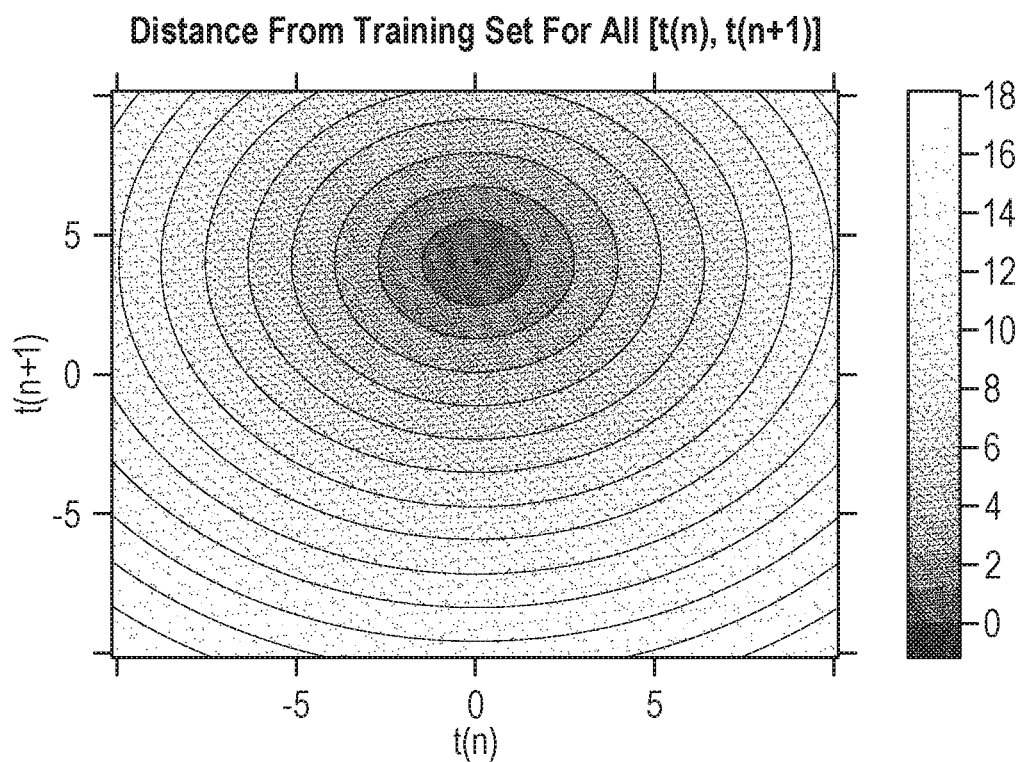
FIGS. 7A-7B illustrate distance from training set for time-series transition analysis.
Figure 7B:
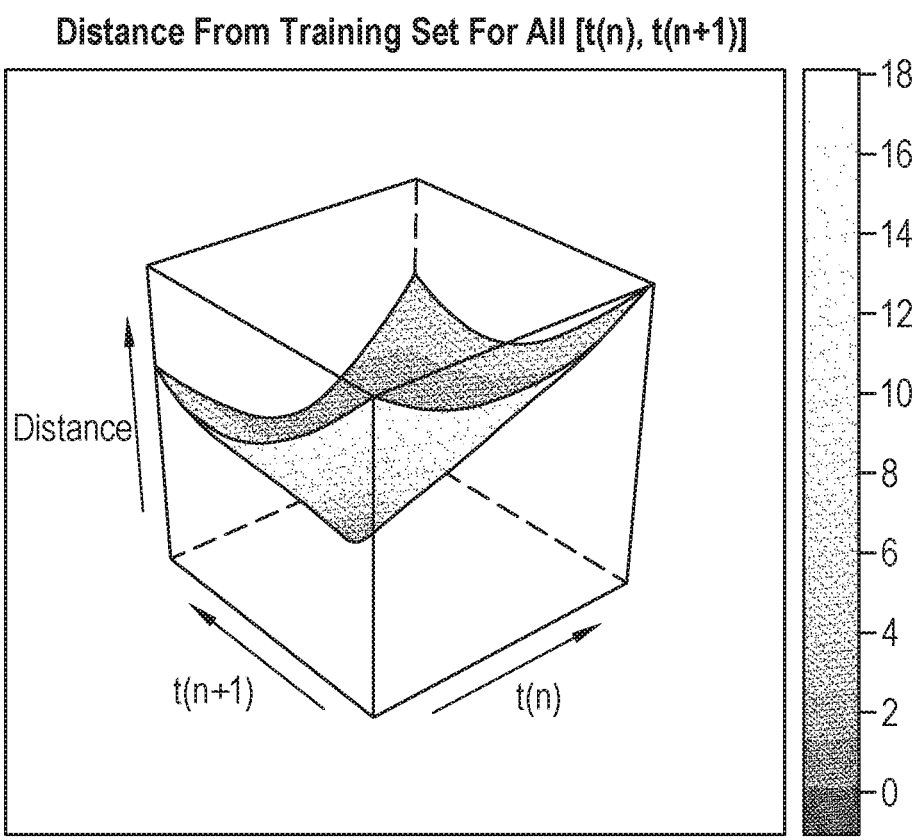

This above described process has been described for a sample that includes two data points. However, this same process may be generalized to multiple dimensions to reduce multiple-dimension inputs to a single metric (e.g., the kth distance between the sample and the training data). In examining FIG. 6 for all potential values, one minimum is at the excursion location of about [0,4]. FIGS. 7A-7B illustrate the kNN metric for multiple input patterns and shows the minimum appears at about [0,4].

Returning to FIG. 2, at block 210, processing logic of the time-series transition analysis system 102 generates a classifier based on the computed distance values. The processing logic may generate the classifier by determining a distance threshold based on the plurality of computed distances. The generating of the classifier may be performed for each of a plurality of instances of the sliding time window 506. The classifier may be generated using logistic regression.

Figure 8:
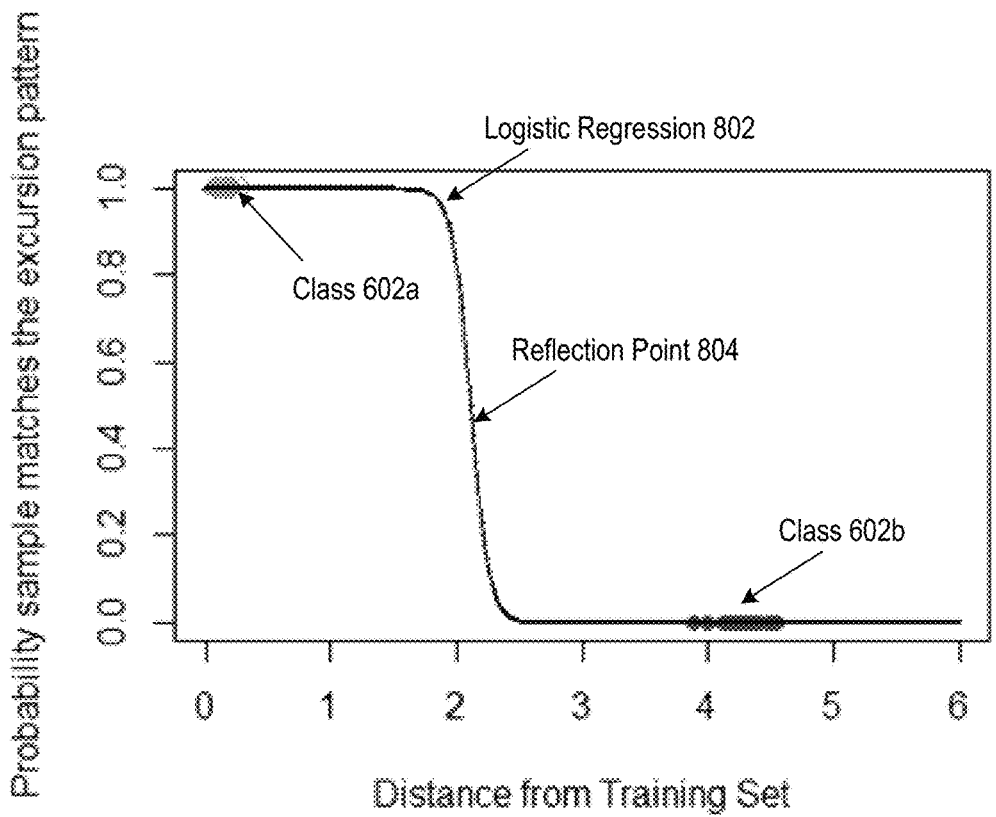
FIG. 8 illustrates logistic regression for time-series transition analysis.

The processing logic may determine the logistic regression 802 (logit fit; as shown in FIG. 8) from the training data (e.g., generate a logit fit 802 to the training data which will yield the probability of the signal matching the excursion). The training data may include the original time-series data as well as the randomized data point combinations and their computed distance values. The equation $p(y|X) = 1/(1 + e^{-\beta * X})$ may be used to determine the logistic regression 802. The training data is used to estimate β. As shown in FIG. 8, the logistic regression 802 may include a location of a transition pattern from a first data point (sample class 602a) to a second data point (sample class 602b). The transition pattern may reflect about a reflection point 804 centrally located on the transition pattern. Time-series data 402 may be detected as a step function with critical transitions (e.g., staircase deposition of short steps). Time-series transition analysis may be used to overcome false positives incurred via bounded approaches.

Time-series transient analysis may utilize tuning parameters. Time-series transition analysis may control how much a sample being out of specification contributes to distance. Increasing how much a sample that is out of specification contributes will make the system more sensitive. Increasing the reflection point 804 makes the system less sensitive. Adjusting the slope of the logistic regression 802 changes the probability of samples close to the reflection 804. Logistic regression 802 may have a reflection limit (e.g., a vertical line) and any sample exceeding the reflection limit may be deemed to not match the expected behavior. In one embodiment, a more or less shallow transition pattern may be desired than that shown in FIG. 8. Theta may be used as tuning parameter to adjust the transition to be more or less shallow.

Figure 9:
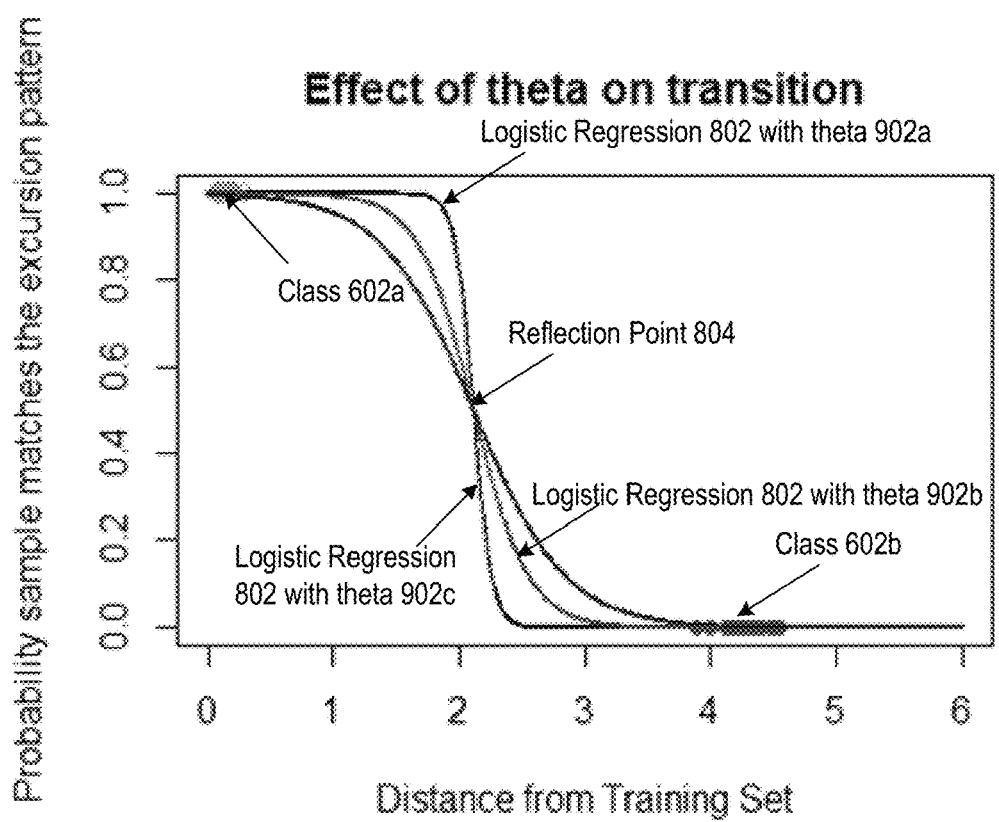
FIG. 9 illustrates effect of theta on logistic regression for time-series transition analysis.

FIG. 9 illustrates the logistic regression 802 with theta 902 adjusted to yield a shallower transition. With the shallower transition, probability can be estimated for all inputs $t_n$ and $t_{n+1}$. Using the β estimate, the probability may maximize at the minimum determined in FIGS. 7A-7B.

The processing logic may receive a first parameter (e.g., theta 902) to adjust sensitivity of the determining of the probability. For example, theta 902a may have a value of one, theta 902b may have a value of two, and theta 902c may have a value of five. The processing logic may adjust shallowness of the transition pattern around the reflection point 804 in view of the first parameter 902. A tuning knob may be used to set the tuning to low sensitivity, high sensitivity, etc. by changing theta 902.

Returning to FIG. 2, at block 212, processing logic of the time-series transition analysis system 102 determines, using the classifier, a probability that new time-series data matches the original time-series data. The processing logic may receive the new time-series data and compute a second distance value between the original time-series data within the time window 506 and the new time-series within the time window 506. The processing logic may determine, using the classifier, whether the new time-series data within the time window 506 has a second distance value that exceeds the distance threshold and generate a fault or notice responsive to determining that the new time-series data within the time window 506 exceeds the distance threshold.

Figure 10A:
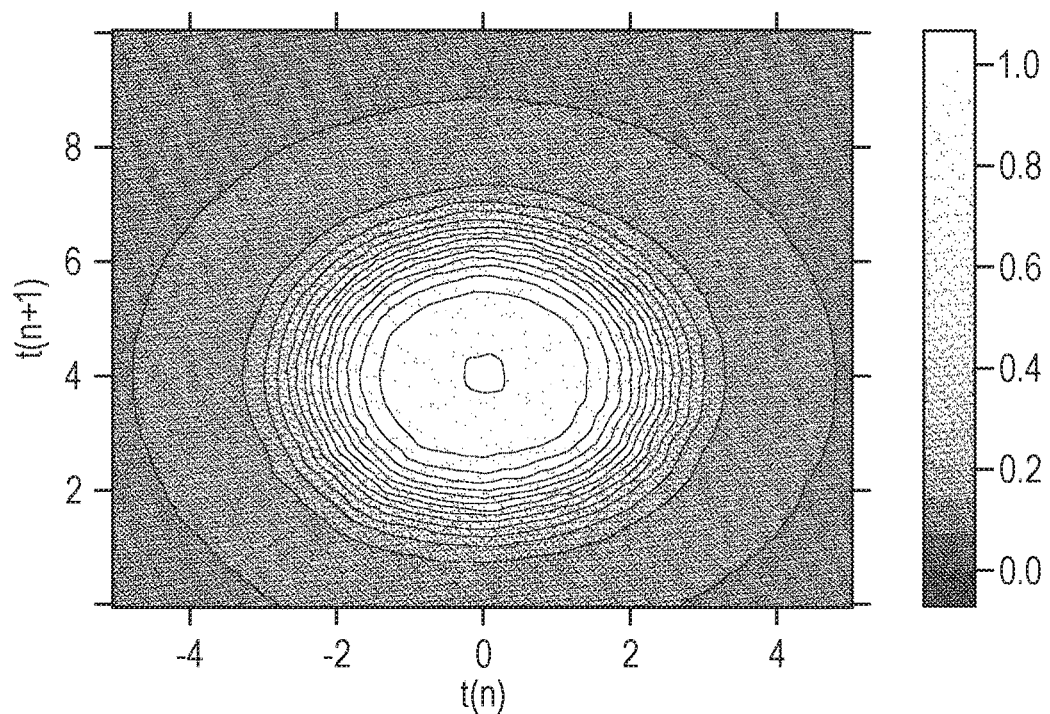
FIGS. 10A-10B illustrate probability of matching the time-series data for time-series transition analysis.
Figure 10B:
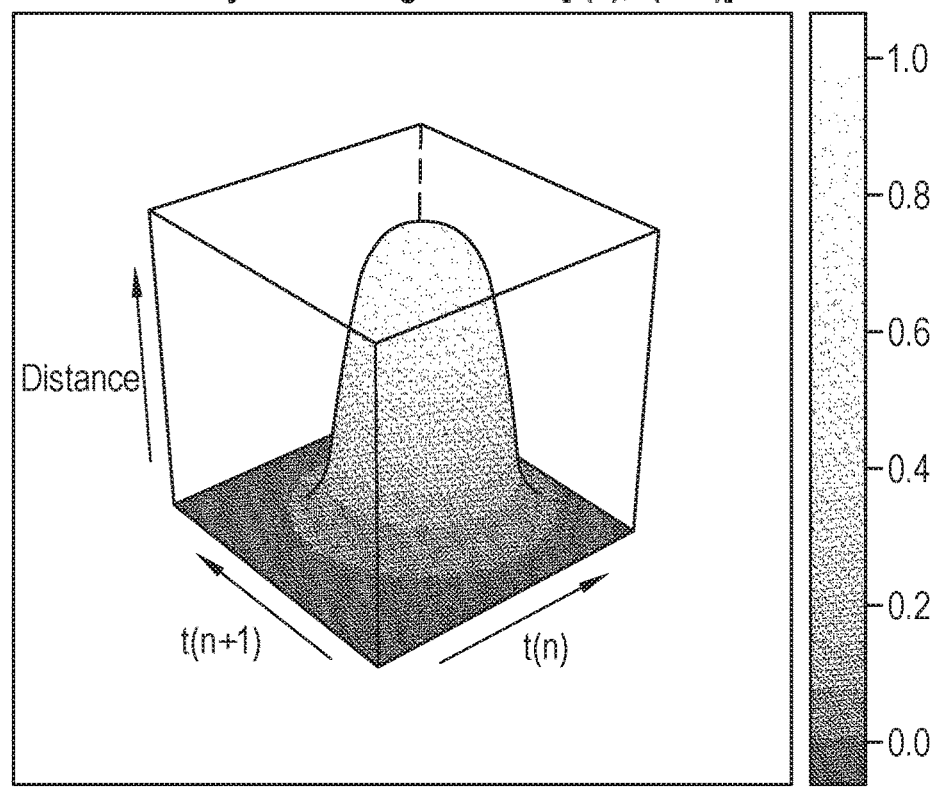

FIGS. 10A-10B show the probability for input pairs to match time-series data 402 for all values [$t_n$, $_{m+1}$] (e.g., maximum at [0,4]).

FIGS. 11A-11D illustrate the probability of various new time-series data 1002 matching time-series data 402 using time-series transition analysis. In FIG. 11A, new time series data 1102a has a pattern that substantially matches the pattern of time-series data 402, resulting in a probability of about 1. In FIG. 11B, the new time series data 1102b at n=25 is larger than expected, so the probability of matching the time-series data 402 is about 0.93. In FIG. 11C, the new time-series data 1102c is higher that time series data 402 at n=25 and lower at n=50, so the probability of matching the target signal is about 0.5. In FIG. 11D, the new time-series data 1102d is substantially higher at n=25 and lower at n=50, so probability of matching the target is about 0.

FIG. 3 illustrates one embodiment of a method 300 for time-series transition analysis. Method 300 can be performed by processing logic that can comprise hardware (e.g., circuitry, dedicated logic, programmable logic, microcode, etc.), software (e.g., instructions run on a processing device), or a combination thereof. In one embodiment, method 300 is performed by the time-series transition analysis system 102 of FIG. 1.

At block 302, processing logic receives time-series data 1102a-d including a first plurality of data points (see FIGS. 11A-11D). Each of the first plurality of data points may be associated with a different time. The time-series data may be generated by a sensor during a process.

At block 304, processing logic compares a first subset of the first plurality of data points from the time-series data 1102a-d that are within a time window 1106 to a second subset of a second plurality of data points from previous time series data 402. The time window 1106 may be a sliding time window that extends backward in time from a current time point by a specified amount. The sliding time window may extend forward in time from the current time point by a specified amount.

At block 306, processing logic computes a distance value that represents a combined distance of the first subset of the first plurality of data points from the second subset of the second plurality of data points.

At block 308, processing logic determines whether the distance value exceeds a distance threshold (see FIGS. 11A-11D).

At block 310, processing logic outputs a notice responsive to determining the distance value exceeds the distance threshold. In one embodiment, the notice includes an indication of the probability of the new time-series data matching the time-series data 402 (e.g., 0.996 for new time series data 1102a, 0.026 for new time series data 1102b, 0.502 for new time-series data 1102c, 0 for new time-series data 1102d). In one embodiment, the notice includes an indication of which sections of new time-series data (e.g., intervals of time windows that correspond to new time-series data) where the new time-series data is below a probability threshold (e.g., 0.5, 0.85) of matching the time-series data 402. In one embodiment, the notice may be displayed via a graphical user interface (e.g., via a graph, a chart, text, etc.). In one embodiment, the notice is one or more of an audible, visual, etc. alert. In one embodiment, the notice is sent by one or more of phone, email, text, etc. In one embodiment, the outputting of the notice causes a one or more of a tool, equipment, component, plant, etc. to one or more of cease activity, pause activity, slow down activity, shut down, etc.

Time-series transition analysis may be used for anomaly detection. In one embodiment, fault detection and classification (FDC) automatically searches recipe sensor data for known defects and/or abnormal signatures. There may be a low user set up cost since expected behavior may be inferred from historical behavior. A known defect library may be independent of recipe set points. The same library can work on multiple recipes. Defect libraries can be developed in-house in a controlled environment and deployed to the field. Known defects can have corrective actions which allow rapid resolution of known defects. Troubleshooting knowledge may be captured for abnormal signatures (e.g., trace or sensor data of interest highlighted to users, user can tag or classify abnormal signatures as well as adding corrective actions). Typical use cases include post-processing recipe data for known defects and knowledge capture on troubleshooting and new defects.

Time-series transition analysis may be used for time-series excursion detection to search time-series for anomaly behaviors not detectable by traditional methods (e.g., SPC, standard fault monitoring methods). There may be a low user set up cost since expected behavior is inferred from historical behavior. The algorithm may be designed to be tolerant of false positives inherent in other approaches (e.g., simple guard band monitoring). Time-series excursions can be stored and used to search historic data or future data. Troubleshooting knowledge may be captured. Typical use cases include post-processing recipe data for known defects, knowledge capture on troubleshooting and new defects, analysis of transient time-series, and repeatability analysis.

Time-series transition analysis may be used to identify a problem when a process is experiencing errors. For example, a chamber may be experiencing intermittent pressure spikes, but finding root cause and solution may be difficult because of one or more of a lack of data export from the tool or inability to recreate the error in-house or on-site. Using time-series transition analysis, a subset of historical cycling data of the tool can be searched for excursion behavior. The excursion behavior may be found (e.g., excursion search identifies multiple runs that do not match expected behavior), the spike in tool data may be matched, and the excursion may be searched for again. Several occurrences of the excursion may allow efficiently troubleshooting and resolving the issue. The issue may be identified as a function of a specific component (e.g., specific valve opening and closing the pump causing fluctuations on pressure reading).

Time-series transition analysis may also be used to detect instability. For example, a tool may use a lower power signature on a recipe. Candidate recipes may be cycled continuously on the tool. Manual analysis of all runs may be infeasible, so intermittent low probability and/or frequency issues may be missed. Using anomaly detection and time-series excursion detection, the power and reflected power may be analyzed for all steps for all runs of candidate recipes. Analysis may quickly identify suspicious behaviors on a percentage of the runs. Some defects observed may have a potential yield impact. Feedback to process development teams may prompt recipe modification and process repeats. Excursions may be reduced from by about 5%.

FIG. 12A illustrates time-series data for time-series transition analysis. As shown in FIG. 12A, n samples or data points of the time-series data 402 are taken instead of 2 samples in a time window as shown in FIG. 4. In one embodiment, samples are taken at [5, 10, 15 . . . 95] which results in 19 samples, making method 200 or 300 a 19-dimension problem instead of a 2-dimension problem. Using time-series transition analysis (e.g., method 200, method 300), a training set is created for the target signal at each sample point.

As shown in FIG. 12B, random samples were selected from the excursion pattern (class 602a) and the $k_{nn}$ metric was estimated. Random samples were selected exhibiting non-excursion behavior (class 602b) and the $k_{nn}$ metric was estimated. As shown in FIG. 12C, the logistical regression 802 is generated using theta of 5. Using the logistic regression 802, the probability of various input signals can be evaluated for various input signals matching the time-series data 402, as shown in FIGS. 13A-13D. The time-series data 402 is the pattern for which trained classifier is generated. New time-series data 1302a-d are the new signals for additional executions of a particular process associated with the original time series data 402. In FIG. 13A, the new time-series data 1302a is shifted relative to the time-series data 402 and the probability of match is about 0.6. In FIG. 13B, the new time-series data 1302b is higher relative to the time-series data 402 at n=0 to n=50 and the probability of match is about 0.7.

Figure 14:
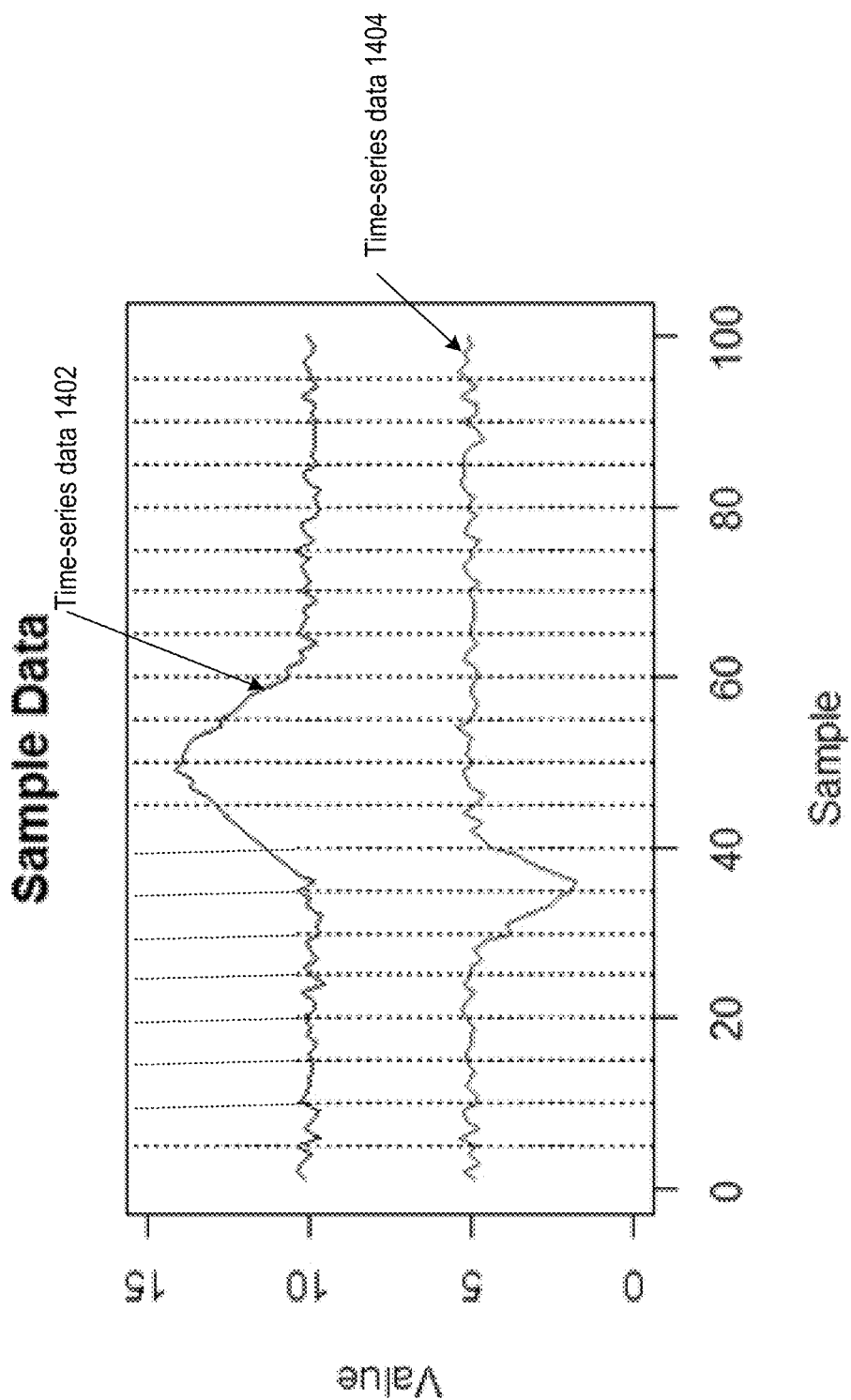
FIG. 14 illustrates time-series data for multiple inputs for time-series transition analysis.
Figure 15A:
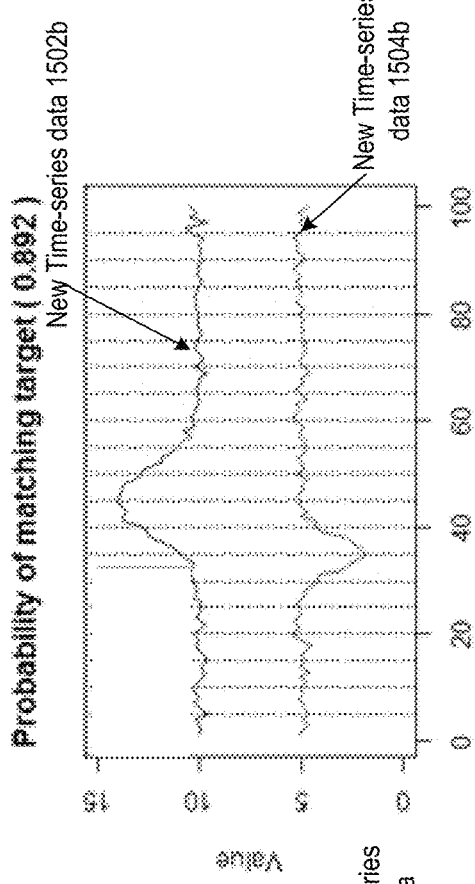
FIGS. 15A-15D illustrate probability of matching the time-series data for multiple inputs for time-series transition analysis.
Figure 15B:
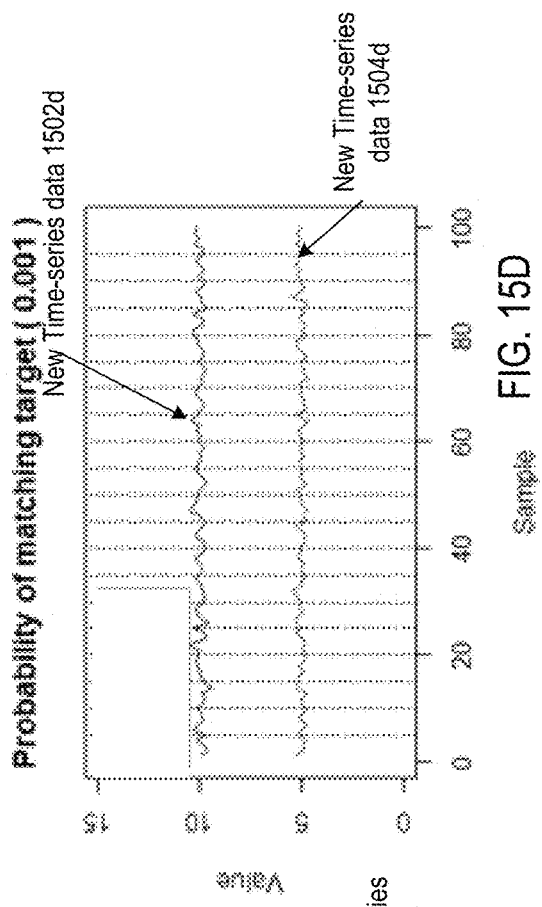
Figure 15C:
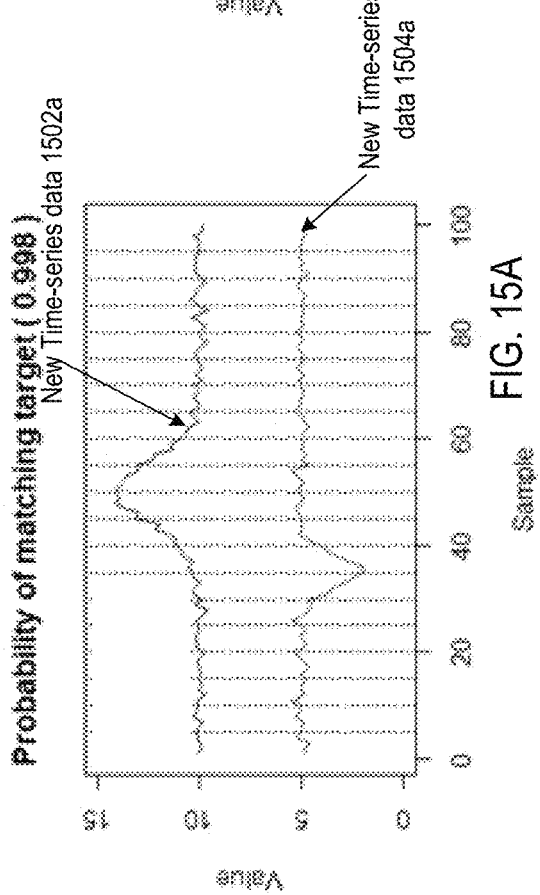
Figure 15D:
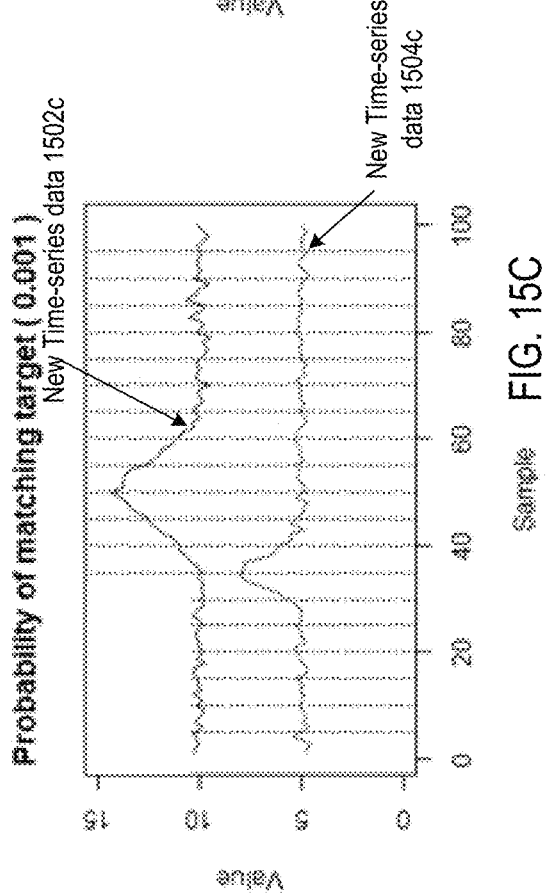

As shown in FIG. 14, the time-series data 402 may include first data 1402 (e.g., time-series data 1402) from a first sensor and second data 1404 (e.g., time-series data 1404) from a second sensor. The processing logic may determine a temporal relationship between the first data and the second data (e.g., capture temporarily-spaced covariate signals for FDC). Each time-series data may have a different pattern on each signal. In FIG. 14, the dip in time-series data 1404 may be associated with an increase in time-series data 1402 (e.g., may cause the increase in time-series data 1402). Time-series transition analysis (e.g., method 200, method 300) can be used to detect the related patterns of time-series data 1402 and 1404. In one embodiment, a single training vector is created with time-series data 1402 and 1404 concatenated (e.g., creating a 39-dimension problem). Using the logistic regression and kNN algorithm, the probability of various input signals matching the time-series data 1402 and 1404 and the relationships between the time-series data 1402 and 1404 can be evaluated. FIGS. 15A-D illustrates the probability of the input signals 1502 and 1504 matching the time-series data 1402 and 1404.

In one embodiment, two training sets, one for each time-series data 402, are created and a two-dimensional logistic regression 802 is used.

In one example, time-series transition analysis may receive data measured by three sensors. The data may include forward power data, reflected power data, and pressure data. The three signals from the three sensors and their co-variance may indicate a signature of plasma strike deviations. Time-series transition analysis may determine that there is an abnormal signature over an interval of time in the data measured by the three sensors. A deviation from expected may be primarily in a forward power signal at about 0.4 seconds into the interval of time. The deviation may cause a higher than normal reflected power signature at the same time. This can be indicative of a plasma striking issue. The pressure may show the correct shape, but shifted by about 0.5 seconds. The pressure spike may be a marker for when the reflected power strikes. Time-series transition analysis of the data from the three sensors may identify where the abnormal signature started that affected one or more other signal data in order to determine what caused the plasma strike deviation.

Figure 16:
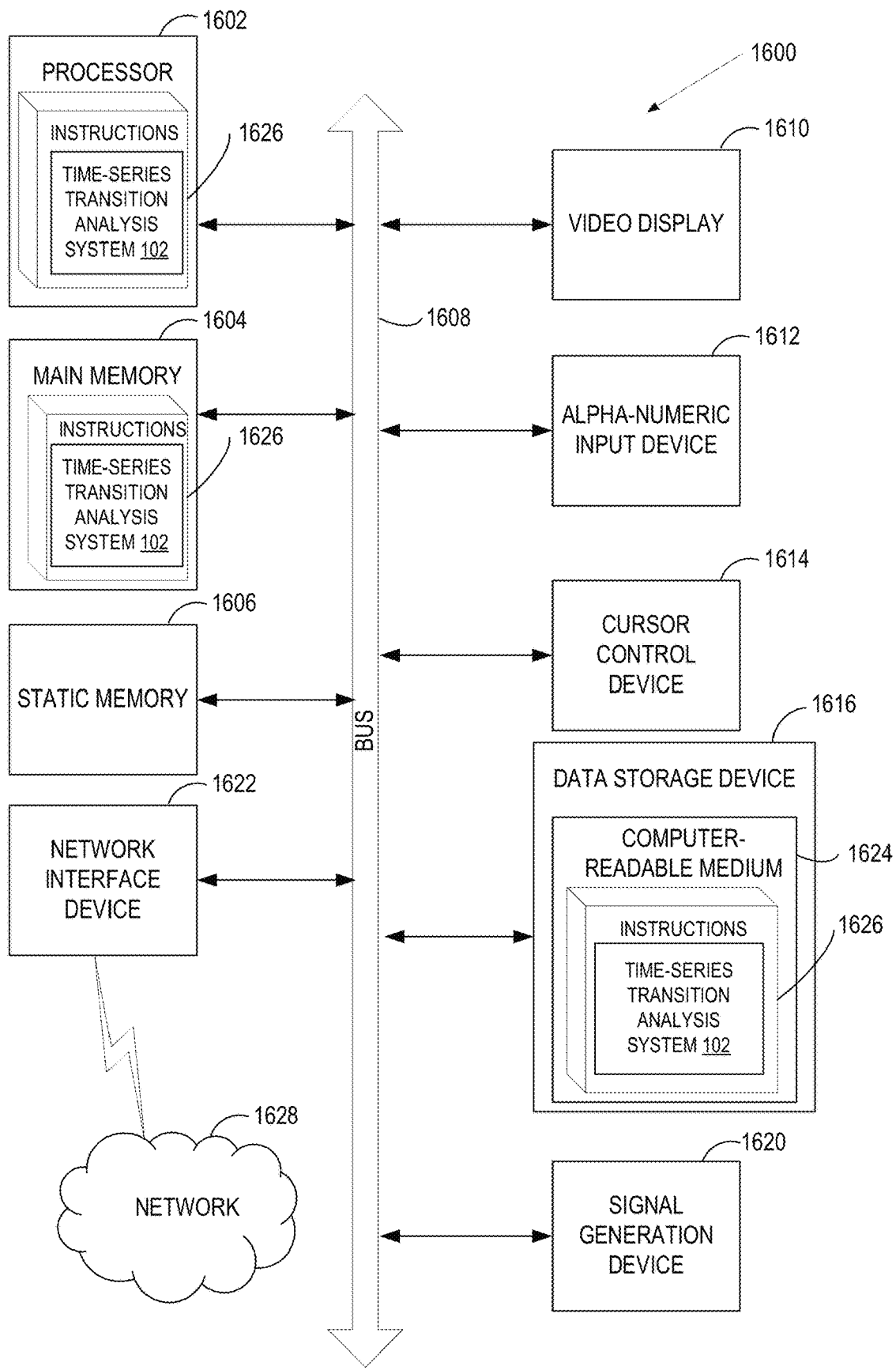
FIG. 16 illustrates an exemplary computer system.

FIG. 16 is a block diagram illustrating an exemplary computing device (or system) 1600. In one embodiment, computing device (or system) 1600 may be time-series transition analysis system 102 of FIG. 1. The computing device 1600 includes a set of instructions for causing the computing device 1600 to perform any one or more of the methodologies discussed herein. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of machines that individually or jointly execute a set (or multiple sets) of instructions to perform any one or more of the methodologies discussed herein.

The exemplary computing device 1600 includes a processing system (processing device) 1602, a main memory 1604 (e.g., read-only memory (ROM), flash memory, dynamic random access memory (DRAM) such as synchronous DRAM (SDRAM), etc.), a static memory 1606 (e.g., flash memory, static random access memory (SRAM), etc.), and a data storage device 1616, which communicate with each other via a bus 1608.

Processing device 1602 represents one or more general-purpose processing devices such as a microprocessor, central processing unit, or the like. More particularly, the processing device 1602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1602 may also be one or more special-purpose processing devices such as an application specific integrated circuit (ASIC), a field programmable gate array (FPGA), a digital signal processor (DSP), network processor, or the like. The processing device 1602 is configured to execute the operations and steps discussed herein.

The computing device 1600 may further include a network interface device 1622. The computing device 1600 also may include a video display unit 1610 (e.g., a liquid crystal display (LCD) or a cathode ray tube (CRT)), an alphanumeric input device 1612 (e.g., a keyboard), a cursor control device 1614 (e.g., a mouse), and a signal generation device 1620 (e.g., a speaker).

The data storage device 1616 may include a computer-readable storage medium 1624 on which is stored one or more sets of instructions 1626 embodying any one or more of the methodologies or functions described herein. In one embodiment, instructions 1626 include time-series transition analysis system 102. The computer-readable storage medium 1624 may be a non-transitory computer-readable storage medium including instructions that, when executed by a computer system, cause the computer system to perform a set of operations including time-series transition analysis (e.g., method 200, method 300, etc.). The instructions 1626 may also reside, completely or at least partially, within the main memory 1604 and/or within the processing device 1602 during execution thereof by the computing device 1600, the main memory 1604 and the processing device 1602 also constituting computer-readable media. The instructions 1626 may further be transmitted or received over a network 1628 via the network interface device 1622.

While the computer-readable storage medium 1624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those including physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining", "identifying", "comparing", "sending", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to a system for performing the operations herein. This system can be specially constructed for the purposes described herein, or it can comprise a general-purpose computer selectively activated or reconfigured by a computer program stored in the computer. Such a computer program can be stored in a computer (or machine) readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, flash memory, or any type of media suitable for storing electronic instructions.

The algorithms and displays presented herein are not inherently related to any particular computer or other apparatus. Various general-purpose systems can be used with programs in accordance with the teachings herein, or it may prove convenient to construct a more specialized apparatus to perform the method steps. The structure for a variety of these systems will appear from the description herein. In addition, embodiments of the present disclosure are not described with reference to any particular programming language. It will be appreciated that a variety of programming languages can be used to implement the teachings of the disclosure as described herein.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:

receiving time-series data, the time-series data having been generated by one or more sensors during a process, wherein the time-series data comprises a first plurality of data points;

generating a training data set comprising a plurality of randomized data points, wherein each randomized data point of the plurality of randomized data points corresponds to one of the first plurality of data points from the time-series data;

generating a plurality of randomized data point combinations using a set of the plurality of randomized data points that are within a time window, wherein a first randomized data point combination of the plurality of randomized data point combinations comprises a first subset of the set of the plurality of randomized data points;

computing a plurality of distance values based on the plurality of randomized data point combinations, wherein a first distance value that is computed for the first randomized data point combination represents a combined distance of the first subset of the set of the plurality of randomized data points from a first subset of the first plurality of data points that corresponds to the first subset of the set of the plurality of randomized data points;

determining logistic regression from the training data set, wherein the logistic regression comprises a location of a transition pattern from a first data point to a second data point, wherein the transition pattern reflects about a reflection point located on the transition pattern;

generating, using the logistical regression, a classifier based on the plurality of distance values; and determining, using the classifier, a probability that new time-series data generated during a new execution of the process matches the time-series data.

2. The method of claim 1, wherein generating the classifier comprises determining a distance threshold based on the plurality of distance values, the method further comprising:
receiving the new time-series data;
computing a second distance value between the time-series data within the time window and the new time-series data within the time window;
determining, using the classifier, whether the new time-series data within the time window exceeds the distance threshold in view of the second distance value; and
generating a fault responsive to determining that the new time-series data within the time window exceeds the distance threshold.

3. The method of claim 2, further comprising:
detecting transitions between set point changes in the process in view of the time-series data; and
detecting a deviation from an expected transition trajectory in the new time-series data, wherein the expected transition trajectory is defined by the time-series data.

4. The method of claim 1, wherein:
the time window is a sliding time window;
the process takes place over an interval of time that is larger than the sliding time window; and
the generating of the randomized data point combinations, the computing of the distance values, and the generating of the classifier is performed for each of a plurality of instances of the sliding time window, wherein each instance of the plurality of instances spans a different time period in the interval of time.

5. The method of claim 1, further comprising:
receiving a tuning parameter; and
adjusting, based on the tuning parameter, slope of the transition pattern around the reflection point to adjust sensitivity of accuracy of detection of whether the new time-series data matches the time-series data.

6. The method of claim 1, further comprising, for the time window, computing, using a k-Nearest Neighbor (kNN) algorithm, a distance threshold, the computing of the distance threshold comprising:
computing, for each corresponding randomized data point combination of the plurality of randomized data point combinations, a Euclidean distance between the corresponding randomized data point combination and each remaining randomized data point combination from the training data set; and
identifying a smallest Euclidean distance from computed Euclidean distances, wherein the smallest Euclidean distance is the distance threshold.

7. The method of claim 1, wherein the time-series data comprises first data from a first sensor and second data from a second sensor, the method further comprising:
determining a temporal relationship between the first data and the second data.

8. A method comprising:
receiving time-series data, the time-series data having been generated by a sensor during a process, wherein the time-series data comprises a first plurality of data points, each of the first plurality of data points being associated with a different time;
comparing a first subset of the first plurality of data points that are within a time window to a second subset of a second plurality of data points;
computing a distance value that represents a combined distance of the first subset of the first plurality of data points from the second subset of the second plurality of data points;
determining whether the distance value exceeds a distance threshold; and
responsive to determining that the distance value exceeds the distance threshold, outputting a notice;
determining logistic regression from the second plurality of data points, wherein the logistic regression comprises a location of a transition pattern, wherein the transition pattern comprises a reflection point;
generating, using the logistic regression, a classifier based on a plurality of distance values; and
determining, using the classifier, a probability that the second plurality of data points generated during a new execution of the process matches the time-series data.

9. The method of claim 8, wherein the time window is a sliding time window that extends backward in time from a current time point by a specified amount.

10. The method of claim 9 further comprising:
generating a training data set comprising a plurality of randomized data points, wherein each randomized data point of the plurality of randomized data points corresponds to one of the first plurality of data points from the time-series data;
generating a plurality of randomized data point combinations using a set of the plurality of randomized data points that are within the time window, wherein the plurality of randomized data point combinations comprises the second subset of the second plurality of data points;
computing, using a k-Nearest Neighbor (kNN) algorithm, the distance threshold for the time window, the computing of the distance threshold comprising:
computing, for each corresponding randomized data point combination of the plurality of randomized data point combinations, a Euclidean distance between the corresponding randomized data point combination and each remaining randomized data point combination from the training data set; and
identifying a smallest Euclidean distance from computed Euclidean distances, wherein the smallest Euclidean distance is the distance threshold.

11. The method of claim 8 further comprising:
receiving a tuning parameter; and
adjusting, based on the tuning parameter, slope of the transition pattern around the reflection point to adjust sensitivity of accuracy of detection of whether the second plurality of data points matches the time-series data.

12. A non-transitory computer-readable storage medium including instructions that, when executed by a computer system, cause the computer system to perform a set of operations comprising:
receiving time-series data, the time-series data having been generated by one or more sensors during a process, wherein the time-series data comprises a first plurality of data points;
generating a training data set comprising a plurality of randomized data points, wherein each randomized data point of the plurality of randomized data points corresponds to one of the first plurality of data points from the time-series data;
generating a plurality of randomized data point combinations using a set of the plurality of randomized data points that are within a time window, wherein a first randomized data point combination of the plurality of randomized data point combinations comprises a first subset of the set of the plurality of randomized data points;

computing a plurality of distance values based on the plurality of randomized data point combinations, wherein a first distance value that is computed for the first randomized data point combination represents a combined distance of the first subset of the set of the plurality of randomized data points from a first subset of the first plurality of data points that corresponds to the first subset of the set of the plurality of randomized data points;

determining logistic regression from the training data set, wherein the logistic regression comprises a location of a transition pattern from a first data point to a second data point, wherein the transition pattern reflects about a reflection point located on the transition pattern;

generating, using the logistical regression, a classifier based on the plurality of distance values; and determining, using the classifier, a probability that new time-series data generated during a new execution of the process matches the time-series data.

13. The non-transitory computer-readable storage medium of claim 12, wherein generating the classifier comprises determining a distance threshold based on the plurality of distance values, the set of operations further comprising:

receiving the new time-series data;

computing a second distance value between the time-series data within the time window and the new time-series data within the time window;

determining, using the classifier, whether the new time-series data within the time window exceeds the distance threshold in view of the second distance value; and generating a fault responsive to determining that the new time-series data within the time window exceeds the distance threshold.

14. The non-transitory computer-readable storage medium of claim 13, the set of operations further comprising:

detecting transitions between set point changes in the process in view of the time-series data; and detecting a deviation from an expected transition trajectory in the new time-series data, wherein the expected transition trajectory is defined by the time-series data.

15. The non-transitory computer-readable storage medium of claim 12, wherein:

the time window is a sliding time window;

the process takes place over an interval of time that is larger than the sliding time window; and the generating of the randomized data point combinations, the computing of the distance values, and the generating of the classifier is performed for each of a plurality of instances of the sliding time window, wherein each instance of the plurality of instances spans a different time period in the interval of time.

16. The non-transitory computer-readable storage medium of claim 12, the set of operations further comprising:

receiving a tuning parameter; and adjusting, based on the tuning parameter, slope of the transition pattern around the reflection point to adjust sensitivity of accuracy of detection of whether the new time-series data matches the time-series data.

17. The non-transitory computer-readable storage medium of claim 12, the set of operations further comprising, for the time window, computing, using a k-Nearest Neighbor (kNN) algorithm, a distance threshold, the computing of the distance threshold comprising:

computing, for each corresponding randomized data point combination of the plurality of randomized data point combinations, a Euclidean distance between the corresponding randomized data point combination and each remaining randomized data point combination from the training data set; and identifying a smallest Euclidean distance from computed Euclidean distances, wherein the smallest Euclidean distance is the distance threshold.

* * * * *